(12) United States Patent
Ries et al.

(10) Patent No.: US 11,339,902 B2
(45) Date of Patent: May 24, 2022

(54) ASSEMBLY OF AN END-FITTING AND AN UNBONDED FLEXIBLE PIPE

(71) Applicant: NATIONAL OILWELL VARCO DENMARK I/S, Brøndby (DK)

(72) Inventors: Jesper Ries, Brøndby (DK); Martin Halsteen, Brøndby (DK); Lars Rohbock, Brøndby (DK); Bo Bøgelund, Helsingør (DK)

(73) Assignee: NATIONAL OILWELL VARCO DENMARK I/S, Brøndby (DK)

( * ) Notice: Subject to any disclaimer, the term of this patent is extended or adjusted under 35 U.S.C. 154(b) by 102 days.

(21) Appl. No.: 16/960,614

(22) PCT Filed: Jan. 10, 2019

(86) PCT No.: PCT/DK2019/050009
§ 371 (c)(1),
(2) Date: Jul. 8, 2020

(87) PCT Pub. No.: WO2019/137591
PCT Pub. Date: Jul. 18, 2019

(65) Prior Publication Data
US 2020/0362996 A1    Nov. 19, 2020

(30) Foreign Application Priority Data

Jan. 12, 2018   (DK) .......................... PA 2018 70022

(51) Int. Cl.
*F16L 17/067* (2006.01)
*F16L 33/01* (2006.01)

(52) U.S. Cl.
CPC ............. *F16L 17/067* (2013.01); *F16L 33/01* (2013.01)

(58) Field of Classification Search
CPC .......... F16L 17/067; F16L 33/01; F16L 33/00
(Continued)

(56) References Cited

U.S. PATENT DOCUMENTS

| 5,720,503 A | 2/1998 | Drijver et al. |
| 6,019,137 A | 2/2000 | Secher et al. |

(Continued)

FOREIGN PATENT DOCUMENTS

| FR | 1253381 A | 2/1961 |
| FR | 2210269 A5 | 7/1974 |

(Continued)

OTHER PUBLICATIONS

International Search Report for International Application No. PCT/DK2019/050009, dated Mar. 1, 2019.
(Continued)

*Primary Examiner* — James M Hewitt, II
(74) *Attorney, Agent, or Firm* — Pearne & Gordon LLP (57) ABSTRACT

An end-fitting and an unbonded flexible pipe, where the unbonded flexible pipe includes from the inside and out an internal pressure sheath, at least one armor layer and an outer sheath, the end-fitting further includes a sealing element. The sealing element includes a seal casing concentrically arranged around the internal pressure sheath, the seal casing includes a recess in which a first sealing element is concentrically arranged around the internal pressure sheath such that the surface of the first sealing element at least forms a line contact with the internal pressure sheath, and a second sealing element is concentrically arranged around the internal pressure sheath in the recess such that the surface of the second sealing element at least form a line contact with the surface of the seal casing and form a line contact with the surface of the first sealing element.

19 Claims, 7 Drawing Sheets

(58) Field of Classification Search
USPC .......................................... 285/222.1–222.5
See application file for complete search history.

(56) References Cited

U.S. PATENT DOCUMENTS

| | | |
|---|---|---|
| 6,360,781 B1 | 3/2002 | Braad |
| 6,450,502 B1 | 9/2002 | Baehl et al. |
| 7,175,208 B2 | 2/2007 | Belcher |
| 2004/0036280 A1 | 2/2004 | Belcher |
| 2010/0194049 A1* | 8/2010 | Kocurek ............... E21B 33/03 |
| | | 277/314 |
| 2017/0211703 A1* | 7/2017 | Hatano ............... F16J 15/062 |
| 2018/0292008 A1* | 10/2018 | Fujita ................... F04B 39/00 |
| 2019/0024830 A1 | 1/2019 | Glejbol |

FOREIGN PATENT DOCUMENTS

| | | |
|---|---|---|
| WO | 9919656 A1 | 4/1994 |
| WO | 2014001249 A1 | 1/2014 |
| WO | 2016062319 A1 | 4/2016 |
| WO | 2017140321 A1 | 8/2017 |

OTHER PUBLICATIONS

Written Opinion for PCT/DK2019/050009 dated Mar. 1, 2019.
Danish Search Report for Application No. PA 2018 70022, dated May 30, 2018.
"Specification for Unbonded Flexible Pipe", ANSI/APII 17J, Fourth edition, May 2014.
"Recommended Practice for Flexible Pipe", ANSI/API 17 B, Fifth Edition, May 2014, previously cited, now including note to see sections 4.3 5; 5.3.5; and 8 2.3.

* cited by examiner

ASSEMBLY OF AN END-FITTING AND AN UNBONDED FLEXIBLE PIPE

TECHNICAL FIELD

The present invention relates to an assembly comprising an end-fitting and an unbonded flexible pipe, where the end-fitting comprises a seal casing comprising at least a first and a second sealing element.

BACKGROUND

End-fittings and unbonded flexible pipes are used for transport of hydrocarbons such as oil and gas, and in particular the end-fittings and the unbonded flexible pipes are used for off-shore transport of oil and gases. The unbonded flexible pipe e.g. conveys the hydrocarbons from a subsea installation to a vessel floating on the sea surface. The unbonded flexible pipe is terminated at each end in an end-fitting which connects the unbonded flexible pipe to the subsea installation and the vessel, respectively.

End-fittings and unbonded flexible pipes of the present type are for example described in the standard "Recommended Practice for Flexible Pipe", ANSI/API 17 B, fifth Edition, May 2014, and the standard "Specification for Unbonded Flexible Pipe", ANSI/API 17J, fourth edition, May 2014. The unbonded flexible pipes usually comprise an internal pressure sheath—often referred to as an innermost sealing sheath or inner liner, which forms a barrier against the outflow of the fluid which is conveyed in the bore of the pipe, and one or usually a plurality of armor layers. Normally the pipe further comprises an outer protection layer, often referred to as the outer sheath, which provides mechanical protection of the armor layers. The outer protection layer may be a sealing layer sealing against ingress of sea water. In certain unbonded flexible pipes one or more intermediate sealing layers are arranged between armor layers. The different layers are terminated in the end-fitting, meaning that the layers are fastened and locked in the end-fitting by use of e.g. mechanical means, welding, or potting using e.g. a filled epoxy resin. Thus, the end-fitting forms a transition between the unbonded flexible pipe and a connection on the vessel, on the subsea installation or between two pipes.

The flexible pipes comprise the internal pressure sheath, which forms the barrier against outflow of the fluid which is conveyed in the bore of the pipe into the surrounding armor layers.

The armor layers usually comprise or consist of one or more helically wound elongated armoring elements, where the individual armor layers are not bonded to each other directly or indirectly via other layers along the pipe.

When the armor layers are wound at an angle larger than 55° relative to the pipe center axis, they are classified as pressure armor layers, whereas armor layers wound with an angle of less than 55° are classified as tensile armor layers. By using un-bonded wound elements, the pipe becomes bendable and sufficiently flexible to roll up for transportation. The unbonded flexible pipe may comprise a carcass which is an armor layer arranged on the inner side of the internal pressure sheath in the bore. The pipe also comprises one or more pressure armors and/or one or more tensile armors arranged on the outer side of the internal pressure sheath.

In this text, the term "unbonded" means that at least two of the layers including the armoring layers and polymer layers are not bonded to each other. In practice, the known pipe normally comprises at least two armor layers located outside the internal pressure sheath and optionally an armor structure, a carcass, located inside the internal pressure sheath.

The end-fitting is usually coupled to the unbonded flexible pipe to terminate at least an outermost armor layer. In most situations, the end-fitting is coupled to the unbonded flexible pipe to terminate all the layers of the unbonded flexible pipe. The end-fitting must be able to withstand both the internal pressure of the pipe and to transfer the axial forces from the pipe into the attached structure via a bolted connection. Furthermore, the end-fitting should be able to shield the inner volumes of the pipe from external pressure, thus preventing the armor layers from being flooded when a pipe is installed in deep waters.

Thus, the end-fitting is a high strength component normally made from steel. All structural parts of the end-fitting are therefore rigid and will require polymeric seals to form a leak-proof connection to the polymer layers of the flexible pipe.

When the pipe comprises one or more tensile armors, these armors are normally terminated in a fixation zone located in a fixation chamber in the end-fitting. The fixation chamber is normally formed between an inner casing and an outer casing of the end-fitting and when the end-fitting is terminating one or more tensile armors, the fixation chamber is filled with a solidifying solid such as a resin like epoxy or concrete.

In practice the known pipe normally comprises at least two armor layers located outside the internal pressure sheath and optionally an armor structure located inside the internal pressure sheath, which inner armor structure normally is referred to as the carcass. The carcass is normally terminated by a ring comprising a screw lock which mechanically blocks the carcass from being pulled through the end-fitting. The armor layers outside the internal pressure sheath are usually terminated in cavities in the end-fitting and locked by use of e.g. epoxy resin. The armor layers on the outer side of the internal pressure sheath are normally constituted by one or two pressure armor layers and one or two tensile armor layers. The outer sheath may be terminated and attached to the end-fitting by mechanical means. The internal pressure sheath is also terminated and attached to the end-fitting by mechanical means and sealed by means of a sealing system, in prior art energized by the compression by a metallic ring. The termination of an unbonded flexible pipe in an end-fitting is normally a manual process which is carried out according to the customers need.

As the unbonded flexible pipes are used in the off-shore industry for transporting oil, gas, water and other fluids between off-shore installations etc. pressures in the range from 100 to 1000 bar (10-100 MPa) and temperatures between −40 and 130° C. are commonplace. For several reasons (e.g. environmental and economic) it is therefore important to avoid that fluid transported within the flexible pipe escapes to the (typically marine) environment. Consequently, it is important to ensure the leak-tightness of the flexible pipe and of its connection to the end-fitting for connecting the flexible pipe to an installation (at land or on a vessel at sea or on the seabed) or for connecting to another pipe, e.g. another flexible pipe or a rigid pipe.

It is of the utmost importance that the internal pressure sheath and the sealing system remains their integrity under all conditions, as a leak is dangerous and may have significant environmental impact. During normal operation, the pipe bore will experience a pressure higher than the surrounding pressure. However, during depressurization events, the bore pressure may become lower than ambient pressure, leading to reversal of the pressure gradient over the sealing. The sealing must be of a nature such that the seal is maintained both under such a pressure reversal and during subsequent re-pressurization of the pipe.

Thus, the sealing system maintaining the barrier properties of the internal pressure sheath should operate under all realistic conditions, which include shifting pressures as well as temperatures exceeding 100° C.

U.S. Pat. No. 6,019,137 deals with a flexible pipe for conveying hydrocarbons, typically at temperatures>80° C., e.g. from offshore wellheads to the surface. The pipe is at its ends fitted with connection end-pieces. Sealing between a sealing barrier and the end-piece is provided by a metal sealing bush that is crimped on the sealing barrier and held axially in place in the end-piece by means of a ring pushing the bush in an axial direction and (in cooperation with a conical form of the annular housing) causing it to press into the sealing barrier. Other solutions comprise combinations of metal and polymer gaskets pressed together by an axial and/or radial pressure in the form of a cooperating, appropriately fastened ring.

U.S. Pat. No. 5,720,503 describes a sealing system for a rotatable fluid conduit coupling for an off-shore swivel. The sealing system comprises a sealing ring of a resilient material located in an annular recess in ring-shaped inner and outer, non-flexible (steel) parts separated by a clearance which is to be sealed by the sealing ring, the sealing ring functioning under a positive pressure difference in the clearance. The sealing ring comprises a body connected to separated, flexible legs, the annular recess comprising deformation limiting means resisting compression of the legs towards one another upon application of a negative pressure across the annular recess.

In the prior art the sealing element or elements must be subject to a compressive contact force built-into the pipe structure around the sealing element, and that typically requires a substantial margin in the form of an excessive compressive force which must be provided to account for dimensional changes and variations in the pipe structure during production, installation and operation. Further, to sustain the sealing pressure between the sealing element and walls of the flexible pipe and the end fitting, these walls must be relatively rigid e.g. be of a relatively thick non-flexible construction e.g. of steel or requiring a rigid insert, a rigid carcass or the like in the flexible pipe beneath the sealing element.

DISCLOSURE OF THE INVENTION

The object of the present invention is to provide an end-fitting and pipe structure with a sealing which is relatively simple and able to self-seal hereby eliminating the need for permanent compressive forces working on the sealing part.

The present invention also provides an assembly of an end-fitting and an unbonded flexible pipe in which an efficient sealing can be provided in an uncomplicated and cost-effective manner The present invention relates to an assembly of an end-fitting and an unbonded flexible pipe, said unbonded flexible pipe comprises from the inside and out an internal pressure sheath, at least one armor layer and an outer sheath, said end-fitting comprises means for terminating said layers of the flexible pipe, and said end-fitting further comprises sealing means, wherein said sealing means comprises a seal casing concentrically arranged around the internal pressure sheath, said seal casing comprises a recess in which at least a first ring shaped sealing element is concentrically arranged around the internal pressure sheath such that the surface of the first ring shaped sealing element at least forms a line contact with the internal pressure sheath, and a second ring shaped sealing element is concentrically arranged around the internal pressure sheath in said recess such that the surface of the second ring shaped sealing element at least form a line contact with the surface of the seal casing and form a line contact with the surface of the first ring shaped sealing element and wherein the hardness of the first ring shaped sealing element is different from the hardness of the second ring shaped sealing element; and the Shore D hardness of the first ring shaped sealing element is in the range of 40 to 70 when measured according to ASTM 2240; and the Shore A hardness of the second ring shaped sealing element is in the range of 80 IRHD to 100 IRHD when measured according to ISO 48N.

The flexible pipe comprises a bore defined by the internal pressure sheath, and the pipe also comprise a centre axis which in the end-fitting coincides with the axis of the end-fitting.

The seal casing comprises a recess facing the outer surface of the internal pressure sheath, this recess houses sealing elements which provide a tight sealing between the surface of the internal pressure sheath and the end-fitting. Thus, the sealing prevents fluid present in the annulus of the pipe to mix with the fluid in the bore of the pipe via the end-fitting. The sealing also prevents fluid present in the annulus to escape to the environment.

The sealing elements are ring-shaped in order to be placed concentrically around the internal pressure sheath, which is also ring-shaped, i.e. forming a tube. The ring-shaped sealing elements have a cross-section which may vary between oval and circular, and any cross-section with one or more rounded curves. The ring-shaped sealing element may also be provided with substantially rectangular cross sections.

The sealing elements form line contact and the term "line contact" is in the context of the present invention used to indicate that the sealing elements do not necessarily have a flat surface to provide the contact. If at least one of the sealing elements surfaces have a substantially convex shape and where a sealing element is in contact with another element and is squeezed towards the substantially flat surface of another element a contact zone is formed between the two elements caused by the forces which influence the elements—this is referred to as the line contact. The size of the substantially flat surfaces thus contacting each other depends on the hardness of the elements.

The term "substantially" should herein be taken to mean that ordinary product variances and tolerances are comprised.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

It has unexpected been realized that a surprising efficient sealing can be achieved by using at least two sealing elements which have different hardness, and, consequently, the hardness of the first ring shaped sealing element should be selected to be different from the hardness of the second ring shaped sealing element. Consequently, it has been possible to provide a sealing with "self-sealing" properties.

The seal casing provides a sealing against the internal pressure sheath. Preferably the internal pressure sheath is made from polymer material. The polymer material is e.g. selected from polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials, such as a polymer (e.g. one of the above mentioned) compounded with reinforcement fibers, such as glass-fibers, carbon-fibers and/or aramide fibers.

It has been found that by selecting the hardness of the first ring shaped sealing element to be in the range of 40 to 70 when measured as Shore D hardness according to ASTM 2240, and selecting the hardness of the second ring shaped sealing element is in the range of 80 IRHD to 100 IRHD when measured as Shore A hardness according to ISO 48N and excellent sealing can be achieved.

Although it is possible to provide a sealing where the second ring shaped sealing element is harder than the first ring shaped sealing element it has been found that a better sealing can be achieved when the first ring shaped sealing element is harder than the second ring shaped sealing element. Thus, the invention provides an embodiment wherein the first ring shaped sealing element is harder than the second ring shaped sealing element.

Moreover, in an embodiment the second ring shaped sealing element has a higher elastic strain limit than the first ring shaped sealing element. Thus, the material of the second ring shaped element has a larger range of elastic deformation than the material of the first ring shaped element. The material of the second ring shaped sealing element also undergo elastic deformation more easy than the material of the first ring shaped sealing element.

Preferably, the ring-shaped sealing elements are made from polymer material, and depending on the hardness and nature of the polymer material, the hardness of the material needs to be measured according to different standards to obtain reliable results, which can be reproduced. Consequently, the hardness of the material of the first ring shaped sealing element is measured as the Shore D hardness according to ASTM 2240 and the hardness of the material of the second ring shaped sealing element measured as the Shore A hardness according to ISO 48N In an embodiment the seal casing comprises a third ring shaped sealing element concentrically arranged around the internal pressure sheath in said recess such that the surface of the third ring shaped sealing element at least form a line contact with the surface of the seal casing and form a line contact with the surface of the first ring shaped sealing element. This embodiment may improve the sealing properties of the seal casing, and the third ring shaped sealing element in principle has the same function as the second ring shaped sealing element. The third ring shaped sealing element and the second ring shaped sealing element may have a line contact.

As the third ring shaped sealing element substantially has the same function as the second sealing element, in an embodiment the third ring shaped sealing element substantially corresponds to the second ring shaped sealing element. The second and the third ring shaped sealing element may placed side by side in the recess of the seal casing.

To improve the sealing properties the surface of the first ring shaped sealing element may in an embodiment where the surface of the sealing element forms a line contact with the internal pressure sheath comprise a groove concentrically arranged around the internal pressure sheath. The groove may increase the flexibility of the first ring shaped sealing element and thereby the sealing properties.

In an embodiment the groove in the first sealing element houses a fourth ring shaped sealing element, where the fourth ring shaped sealing element at least forms a line contact with the internal pressure sheath and a contact with the surface of the first ring shaped sealing element. The fourth sealing element may serve to improve the sealing properties of the seal casing. The fourth sealing element can be made from the same material as the second ring shaped sealing element.

To obtain good sealing properties the Shore D hardness of the first ring shaped sealing element is in the range of 45 to 65, such as in the range of 48 to 62 when measured according to ASTM 2240.

Also for obtaining good sealing properties the Shore A hardness of the second ring shaped sealing element is in the range of 82 IRHD to 98 IRHD, such as in the range of 85 IRHD to 95 IRHD when measured according to ISO 48N.

It has been found that excellent sealing properties can be achieved when the second ring shaped sealing element is manufactured from a cross-linked polymer material, and in an embodiment the degree of crosslinking is at least 50%, such as at least 65%.

The first ring shaped sealing element is advantageously made from polymer material, such as thermoplastic polymer and in an embodiment the degree of crosslinking of the polymer material of the first ring shaped sealing element is at least 10 times lower than the degree of crosslinking of the second ring shaped sealing element. The lower degree of cross-linking provides the first ring shaped sealing element with good properties in respect of sealing against the internal pressure sheath.

In an embodiment the first ring shaped sealing element is made from a thermoplastic polymer material. The embodiment provides sealing means with good properties.

In an embodiment the first ring shaped sealing element is made from a thermoplastic polymer material reinforced with particles, flakes or fibres. This embodiment also improves the properties of the sealing.

Preferably the first ring shaped sealing element is manufactured from polytetrafluoroethylene (PTFE), thermoplastic elastomer (PTE), perfluoroalkoxy alkane (PFA), poly (fluorenyle ethynylene) (PFE), polyurethane (PU) or ultra high molecular weight polyethylene (UHMWPE) or polyetheretherketone (PEEK).

Preferably the second ring shaped sealing element is manufactured from one or more elastomer as defined by ASTM D1418, such as a fluoroelastomer.

To obtain a sealing which is durable and has long lasting sealing properties the invention provides an embodiment where the first ring shaped sealing element and/or the second ring shaped sealing element is/are manufactured from fluoro-containing polymer material The seal casing should be relatively uncomplicated to produce and in an embodiment the recess in the seal casing has a substantially rectangular cross-section. Thus, the seal casing can be produced with a rather uncomplicated geometry using simple tools In an embodiment the seal casing has a substantially U-shaped cross-section. The U-shaped cross-section facilitates the housing of the sealing elements in the seal casing.

The flexible pipe comprises at least one armor layer and preferably the flexible pipe comprises at least one tensile armor, which serves to take up tensile forces in the pipe.

Preferably the tensile armor is made from metallic elongate members where the tensile armor the elongate members are wound around the pipe with a winding angle of 25 to 55 degrees, such as up to 65 degrees in respect of the axis of the pipe.

The flexible pipe preferably also comprises at least one pressure armor to absorb pressure forces in the pipe.

The pressure armor can be made from metallic elongate members and in an embodiment the pressure armor comprises elongate members wound around the pipe with a winding angle of 55 to 89 degrees, such as up to 89.8 degrees in respect of the axis of the pipe.

The flexible pipe may also comprise a carcass. The carcass is mounted in the bore of the pipe and supports the internal pressure sheath. The carcass is manufactured from metallic elongate members and the elongate members are wound with a winding angle of about 70 to about 89 degrees in respect of the axis of the pipe to form a tubular member in the bore of the pipe.

The different armor layers, i.e. tensile armor, pressure armor and carcass are preferably all terminated in the end-fitting.

The invention also relates to use of a seal casing in an assembly of an end-fitting and an unbonded flexible pipe, where said unbonded flexible pipe comprises from the inside and out an internal pressure sheath, at least one armor layer and an outer sheath, said end-fitting comprises means for terminating said layers of the flexible pipe, wherein the seal casing is concentrically arranged around the internal pressure sheath, said seal casing comprises a recess in which at least a first ring shaped sealing element is concentrically arranged around the internal pressure sheath such that the surface of the first ring shaped sealing element at least forms a line contact with the internal pressure sheath, and a second ring shaped sealing element is concentrically arranged around the internal pressure sheath in said recess such that the surface of the second ring shaped sealing element at least form a line contact with the surface of the seal casing and form a line contact with the surface of the first ring shaped sealing element and wherein the hardness of the first ring shaped sealing element is different from the hardness of the second ring shaped sealing element; and the Shore D hardness of the first ring shaped sealing element is in the range of 40 to 70 when measured according to ASTM 2240; and the Shore A hardness of the second ring shaped sealing element is in the range of 80 IRHD to 100 IRHD when measured according to ISO 48N.

In an embodiment, the use comprises that the first ring shaped sealing element and/or the second ring shaped sealing element is/are manufactured from fluoro-containing polymer material.

DETAILED DESCRIPTION OF THE INVENTION

The invention will now be described in further details with reference to embodiments shown in the drawing in which.

The figures are not accurate in every detail but only sketches intended to show the principles of the invention. Details which are not a part of the invention may have been omitted. In the figures the same reference numbers are used for the same parts.

Figure 1:
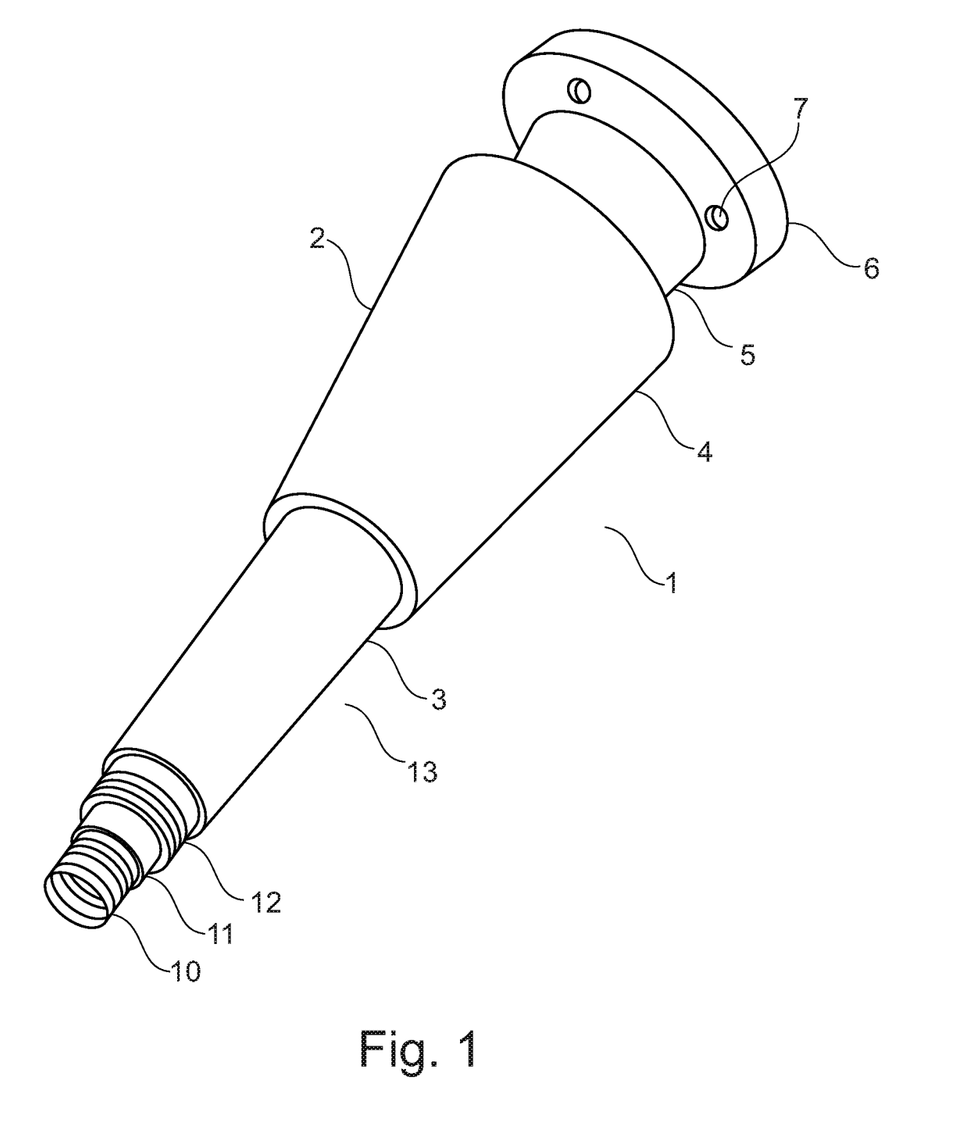
FIG. 1 shows an assembly of an end-fitting and a pipe.

FIG. 1 illustrates an assembly 1 comprising an end-fitting 2 and an unbonded flexible pipe 3.

The end-fitting 2 comprises a body part 4, a channel 5 and a flange 6 for connection to a connector or another end-fitting. The flange 6 comprises holes 7 for bolts which may be used for connecting the end-fitting to other equipment.

The unbonded flexible pipe 3 comprises, from the inside and out, a carcass 10, an internal pressure sheath 11, a tensile armour 12 and an outer sheath 13. The internal pressure sheath 11 is made from polyethylene and the outer sheath 13 is made from polyamide. The carcass 10 is made from stainless steel and the tensile armor 12 is made from carbon steel.

Figure 2:
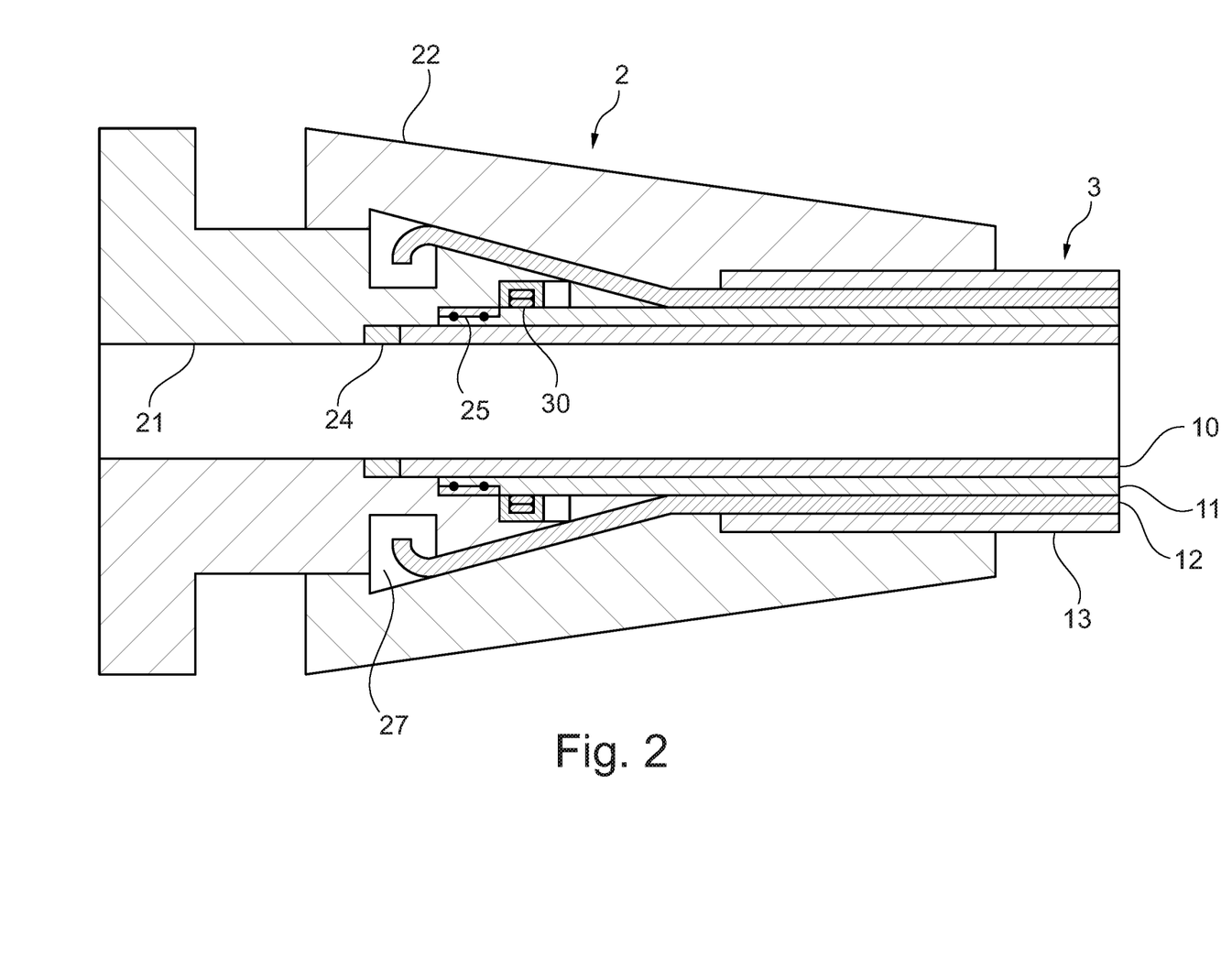
FIG. 2 shows a cross section of an assembly according to the invention.

FIG. 2 shows a cross section of the assembly of FIG. 1. As it can be seen the end-fitting 2 comprises an inner casing 21 and an outer casing 22. The layers of the flexible pipe are terminated in the end-fitting. The carcass 10 is terminated by means of a carcass ring 24. The internal pressure sheath 11 is attached to the end-fitting by attachment means 25 and a sealing is provided by the seal casing 30. The tensile armor 12 is terminated in fixation chamber and fixed by means of epoxy.

The outer sheath 13 is attached to the outer casing 22 of the end-fitting.

It should be understood that the FIGS. 1 and 2 shows a rather simple configuration of an assemble of an end-fitting and an unbonded flexible pipe. An unbonded flexible pipe may comprise several layers, such as from the inside and out a carcass, an internal pressure sheath, one or two pressure armors, one or two tensile armors and an outer sheath.

In FIGS. 1 and 2 a simpler configuration has been chosen to emphasize the invention.

Figure 3:
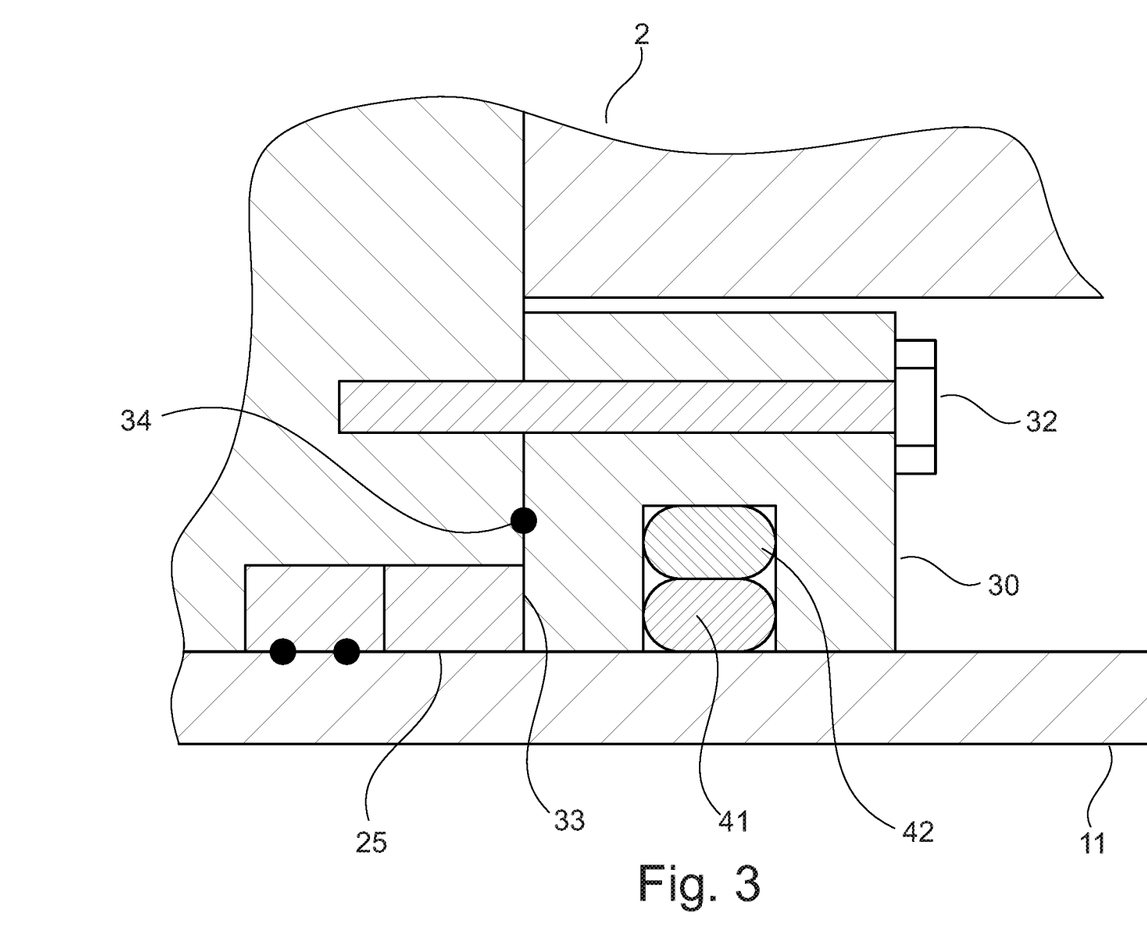
FIG. 3 shows further details of the seal casing.

FIG. 3 shows details of the seal casing 30 mounted in the end-fitting 2. The seal casing 30 comprises a recess 31 in which a first sealing element 41 and a second sealing element 42 are located. The recess 31 provides the seal casing 30 with a substantially U-shaped cross-section. The seal casing 30 is attached to the end-fitting by bolt 32. In the interface 33 between the end-fitting 2 and seal casing 30 a seal ring 34 is provided.

The seal casing 30 and the sealing elements 41, 42 are ring shaped to be concentric around the internal pressure sheath 11, i.e. they share the same centre axis. The seal casing 30 is contacting the internal pressure sheath 11 without providing any substantial pressure on the internal pressure sheath 11.

Figure 4:
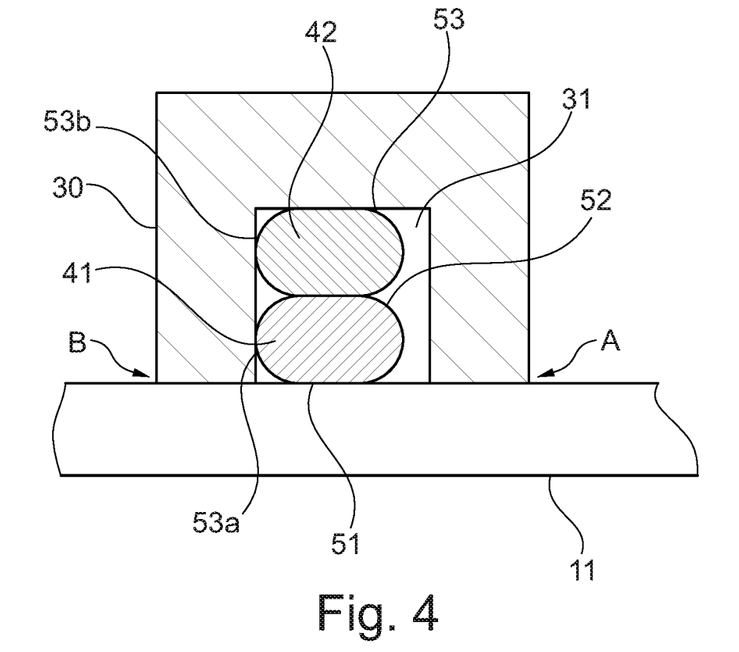
FIG. 4 shows an embodiment of the seal casing.

FIG. 4 shows an embodiment of the seal casing 30 comprising a first sealing element 41 and a second sealing element 42 in the recess 31.

FIG. 4 illustrates the seal casing 30 in loaded condition, i.e. in a situation where the sealing elements are "energized". In FIG. 1 a fluid with high pressure is present on the A-side of the seal casing 30 and a fluid with lower pressure is present on the B-side of the seal casing 30.

This has the effect that the sealing elements 41 and 42 are pressed towards the B-side of the recess 31. Moreover, a line contact 51 is formed between the internal pressure sheath 11 and the first sealing element 41. A line contact 52 is also formed between the first sealing element 41 and the second sealing element 42. The second sealing element 42 has a line contact 53 with the surface of the seal casing 30. The second sealing element 42 also has a line contact 53b with the surface of the seal casing 30 at the B-side of the seal casing.

In this particular situation the first sealing element also have a line contact 53a with the surface of the seal casing 30 at the B-side of the seal casing.

As seen, the passage from the A-side to the B-side of the seal casing is efficiently blocked by the energized sealing elements.

Figure 5:
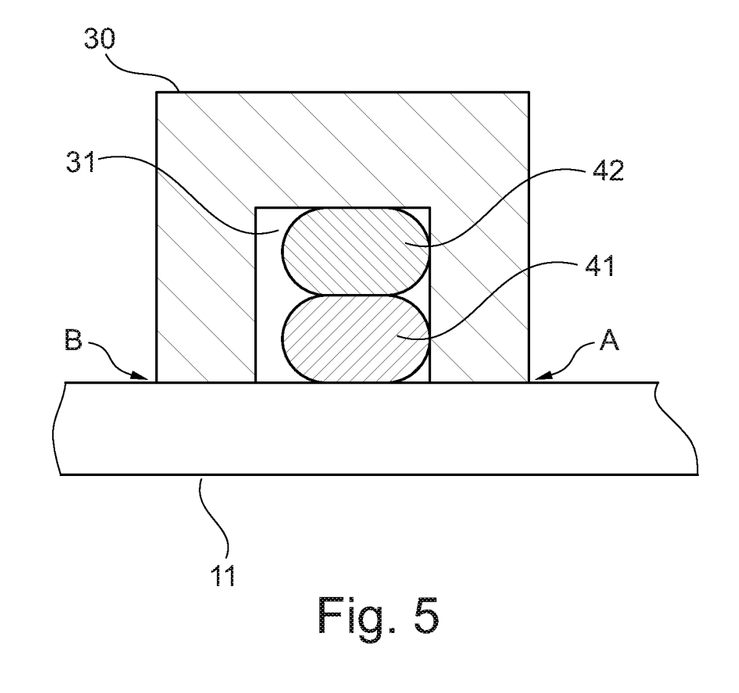
FIG. 5 shows an embodiment of the seal casing.

FIG. 5 in principle shows the same embodiment, but here the pressure of the fluid on the B-side is higher than the pressure of the fluid on the A-side of the seal casing 30. Thus, the first sealing element 41 and the second sealing element 42 forms line contact with the surface of the seal casing 30 in the recess 31 at the B-side.

Figure 6:
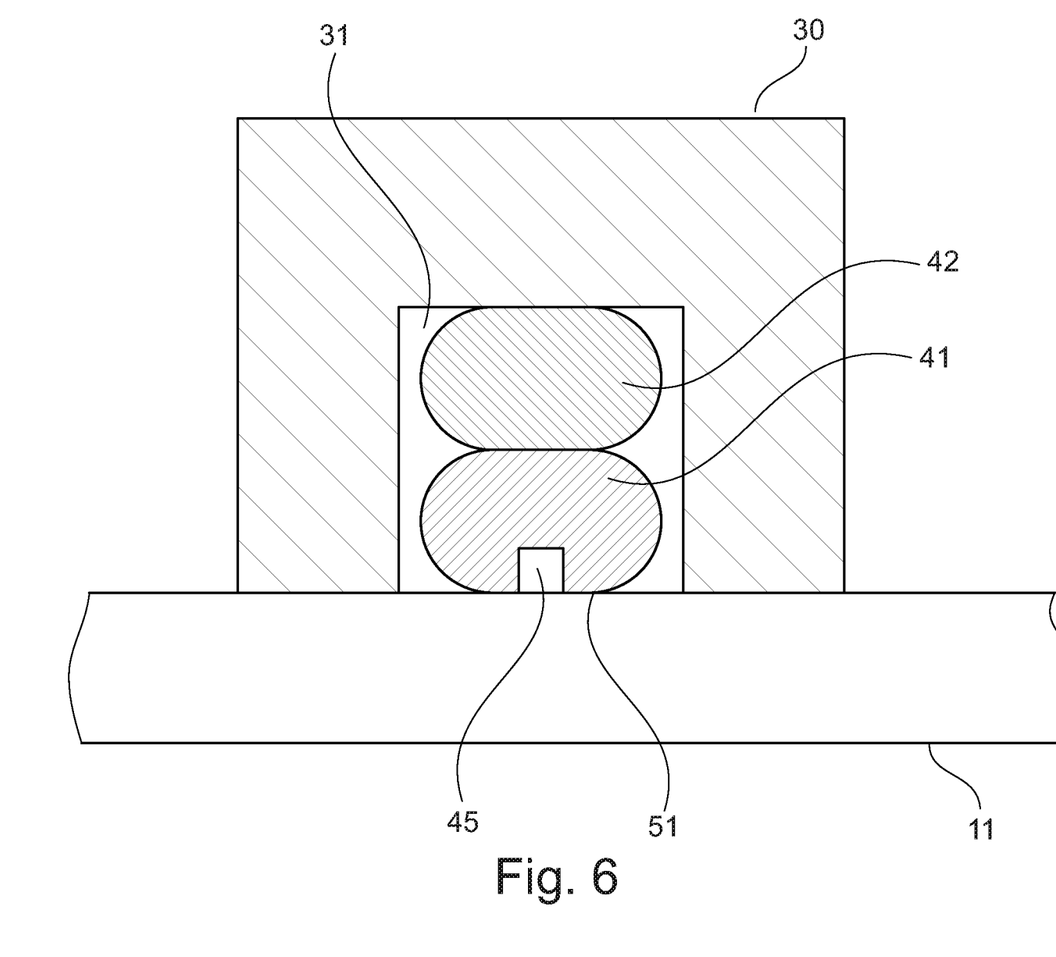
FIG. 6 shows an embodiment of the seal casing.

The embodiment of FIG. 6 in principle corresponds to the embodiments in FIGS. 4 and 5. However, the first sealing element 41 is provided with a groove in the surface with line contact 51 with the internal pressure sheath 11. The groove 45 may provide improved sealing properties of the first sealing element 41. The embodiment of FIG. 6 is in unloaded condition, i.e. the sealing elements are not energized.

Figure 7:
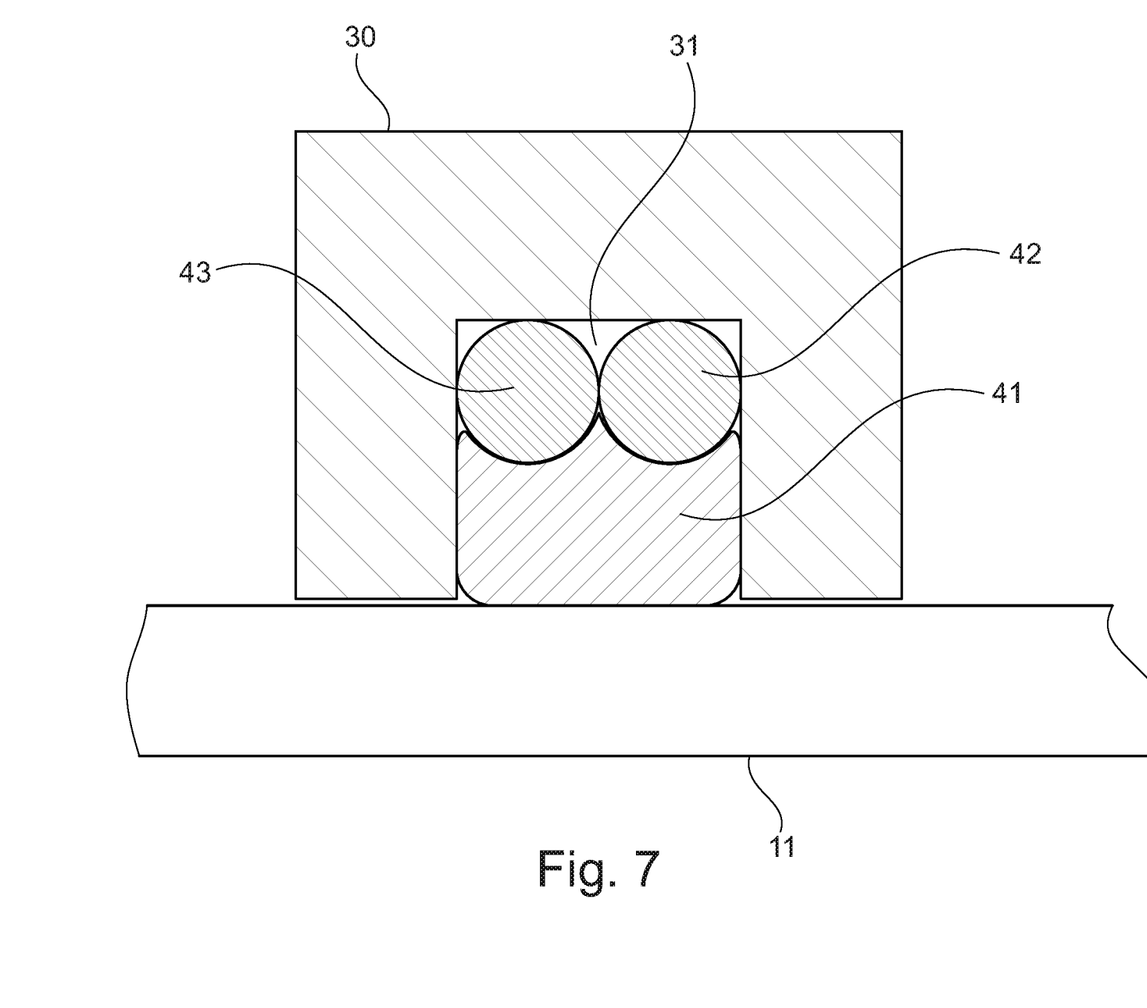
FIG. 7 shows an embodiment of the seal casing.

In the embodiment of FIG. 7 the seal casing 30 comprised a third sealing element 43. The third sealing element is placed in the recess 31 in side-to-side configuration with the second sealing element 42, both on top of the first sealing element 41. This embodiment may also improve the sealing properties of the seal casing.

Figure 8:
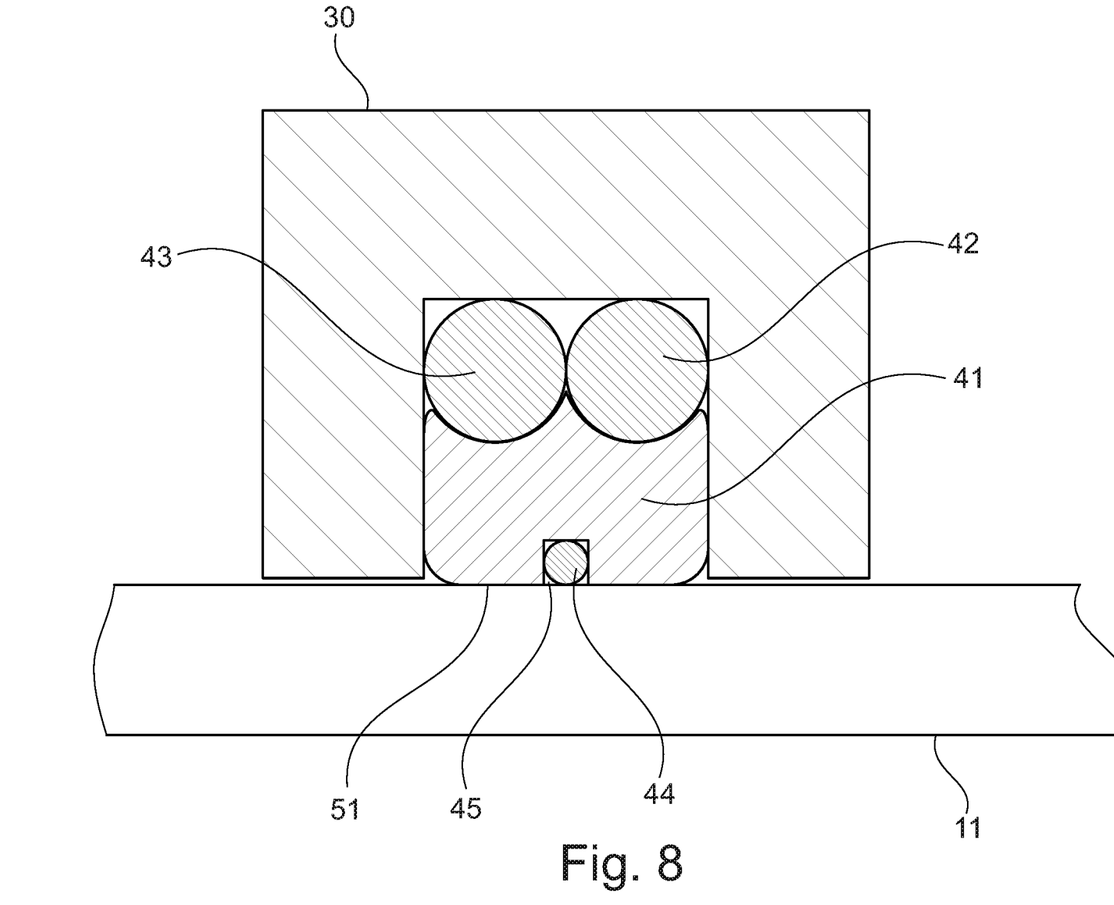
FIG. 8 shows an embodiment of the seal casing.

The embodiment of the seal casing 30 shown in FIG. 8 substantially corresponds to the embodiment seen in FIG. 7. The difference between the embodiments is that in FIG. 8 the first sealing element 41 comprises a groove 45 in the surface with line contact 51 with the internal pressure sheath 11. In the groove 45 is mounted a fourth sealing element 44.

The fourth sealing element 44 is preferably made from the same material as the second sealing element 42 and the third sealing element 43.

The embodiment of FIG. 8 also provides excellent sealing properties.

EXAMPLE

A sealing device corresponding to the sealing device shown in FIG. 8 is provided.

The dimensions of the sealing elements are approximately as follows:

The first ring shaped element: cross-section 2.0 cm×1.5 cm
The second ring shaped element: diameter 0.9 cm
The third ring shaped element: diameter 0.9 cm
The fourth ring shaped element: diameter 0.4 cm The sealing elements are mounted in an end-fitting in a seal casing made from stainless steel and having a recess with dimensions being approximately 2.0 cm×2.2 cm.

The seal casing is adapted to seal around an internal pressure sheath terminated in the end-fitting and having an outer diameter 24 cm. The internal pressure sheath is manufactured from polyethylene, and attached in the end-fitting by conventional attachment means.

The material for the first sealing element is a PTFE having the properties as shown in table 1.

TABLE 1

Properties of PTFE

| Property | Value | Test method |
| --- | --- | --- |
| Hardness Shore D | ~50 | ASTM D2240 |
| Specific gravity | ~2.13 g/cm$^3$ | ASTM D7922240 |
| Tensile strength | ~30 MPa | ASTM D4894 |
| Elongation at break | ~350% | ASTM D4894 |

In respect of the second sealing element, the third sealing element and fourth sealing element, the same material is chosen. The material is a FKM elastomer having the properties shown in table 2.

TABLE 2

Properties of FKM elastomer

| Property | Value | Test method |
| --- | --- | --- |
| Hardness Shore A | ~90 IRHD | ISO 48N |
| Specific gravity | ~1.82 g/cm$^3$ | ISO 2781 |
| Tensile strength | ~15 MPa | ISO 37 |
| Elongation at break | ~100% | ISO 37 |

The end-fitting is tested in a factory test equipment with a fluid (rape seed oil) having a pressure of approx. 100 bar and a temperature of approx. 80° C. No leaks are detected after 30 days in the test equipment.

What is claimed is:

1. An assembly of an end-fitting and an unbonded flexible pipe,
    said unbonded flexible pipe comprises from the inside and out an internal pressure sheath, at least one armor layer and an outer sheath,
    said layers of the flexible pipe being terminated in said end-fitting, and said end-fitting further comprises a sealing arrangement,
    wherein said sealing arrangement comprises a seal casing concentrically arranged around the internal pressure sheath,
    said seal casing comprises a recess in which at least a first ring shaped sealing element is concentrically arranged around the internal pressure sheath to provide that the surface of the first ring shaped sealing element forms at least a line contact with the internal pressure sheath,
    and a second ring shaped sealing element is concentrically arranged around the internal pressure sheath in said recess to provide that the surface of the second ring shaped sealing element forms at least a line contact with the surface of the seal casing and forms a line contact with the surface of the first ring shaped sealing element and wherein the hardness of the first ring shaped sealing element is different from the hardness of the second ring shaped sealing element; and the Shore D hardness of the first ring shaped sealing element is in the range of 40 to 70 measured according to ASTM 2240; and the Shore A hardness of the second ring shaped sealing element is in the range of 80 IRHD to 100 IRHD measured according to ISO 48N.

2. An assembly according to claim 1, wherein the second ring shaped sealing element has a higher elastic strain limit than the first ring shaped sealing element.

3. An assembly according to claim 1, wherein the seal casing comprises a third ring shaped sealing element concentrically arranged around the internal pressure sheath in said recess to provide that the surface of the third ring shaped sealing element forms at least a line contact with the surface of the seal casing and forms a line contact with the surface of the first ring shaped sealing element.

4. An assembly according to claim 3, wherein third ring shaped sealing element corresponds to the second ring shaped sealing element.

5. An assembly according to claim 1, wherein the surface of the first ring shaped sealing element comprises a groove concentrically arranged around the internal pressure sheath.

6. An assembly according to claim 5, wherein the groove houses a fourth ring shaped sealing element, said fourth ring shaped sealing element forms at least a line contact with the internal pressure sheath and a contact with the surface of the first ring shaped sealing element.

7. An assembly according to claim 1, wherein the Shore D hardness of the first ring shaped sealing element is in the range of 45 to 65 measured according to ASTM 2240.

8. An assembly according to claim 1, wherein the Shore A hardness of the second ring shaped sealing element is in the range of 82 IRHD to 98 IRHD measured according to ISO 48N.

9. An assembly according to claim 1, wherein the second ring shaped sealing element is made from a cross-linked polymer material.

10. An assembly according to claim 9, wherein the first ring shaped sealing element is made from a polymer material, and wherein a degree of crosslinking of the polymer material of the first ring shaped sealing element is at least 10 times lower than the degree of crosslinking of the second ring shaped sealing element.

11. An assembly according to claim 1, wherein the first ring shaped sealing element is made from a thermoplastic polymer material.

12. An assembly according to claim 1, wherein the first ring shaped sealing element is made from a thermoplastic polymer material reinforced with particles, flakes or fibres.

13. An assembly according to claim 1, wherein the first ring shaped sealing element is made from polytetrafluoroethylene (PTFE), thermoplastic elastomer (PTE), perfluoroalkoxy alkane (PFA), poly(fluorenyle ethynylene) (PFE), polyurethane (PU), ultra high molecular weight polyethylene (UHMWPE) or polyetheretherketone (PEEK).

14. An assembly according to claim 1, wherein the second ring shaped sealing element is made from one or more elastomers as defined by ASTM D1418.

15. An assembly according to claim 1, wherein at least one of the first ring shaped sealing element and the second ring shaped sealing element is made from fluoro-containing polymer material.

16. An assembly according to claim 1, wherein the recess in the seal casing has a rectangular cross-section.

17. An assembly according to claim 1, wherein the seal casing has a substantially U-shaped cross-section.

18. A method of applying a seal casing in an assembly of an end-fitting and an unbonded flexible pipe, where said unbonded flexible pipe comprises from the inside and out an internal pressure sheath, at least one armor layer and an outer sheath, said layers of the flexible pipe being terminated in said end-fitting, wherein the seal casing is arranged concentrically around the internal pressure sheath, said seal casing comprises a recess in which at least a first ring shaped sealing element is concentrically arranged around the internal pressure sheath such that the surface of the first ring shaped sealing element is arranged to form at least a line contact with the internal pressure sheath, and a second ring shaped sealing element is arranged concentrically around the internal pressure sheath in said recess to provide that the surface of the second ring shaped sealing element forms at least a line contact with the surface of the seal casing and form a line contact with the surface of the first ring shaped sealing element and wherein the hardness of the first ring shaped sealing element is different from the hardness of the second ring shaped sealing element; and the Shore D hardness of the first ring shaped sealing element is in the range of 40 to 70 measured according to ASTM 2240; and the Shore A hardness of the second ring shaped sealing element is in the range of 80 IRHD to 100 IRHD measured according to ISO 48N.

19. The method according to claim 18, wherein the first ring shaped sealing element and/or the second ring shaped sealing element is/are manufactured from fluoro-containing polymer material.

* * * * *